(12) United States Patent
Kinney, Jr. et al.

(10) Patent No.: US 7,237,769 B2
(45) Date of Patent: Jul. 3, 2007

(54) COOLING TOWER FILM FILL APPARATUS AND METHOD

(75) Inventors: Ohler L. Kinney, Jr., Overland Park, KS (US); Kenneth P. Mortensen, Bonner Springs, KS (US); Eldon F. Mockry, Lenexa, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 0 days.

(21) Appl. No.: 10/879,073

(22) Filed: Jun. 30, 2004

(65) Prior Publication Data

US 2006/0001182 A1    Jan. 5, 2006

(51) Int. Cl.
*B01F 3/04* (2006.01)

(52) U.S. Cl. .............. 261/112.2; 261/DIG. 11

(58) Field of Classification Search .............. 261/112.1, 261/112.2, DIG. 11
See application file for complete search history.

(56) References Cited

U.S. PATENT DOCUMENTS

| | | | |
|---|---|---|---|
| 2,160,677 A * | 5/1939 | Romanoff ................. 428/183 |
| 3,351,441 A * | 11/1967 | Gewiss ................. 428/594 |
| 3,433,692 A * | 3/1969 | Gewiss ................. 156/197 |
| 3,618,778 A * | 11/1971 | Benton et al. ........... 210/150 |
| 3,969,473 A * | 7/1976 | Meek ................. 264/505 |
| 4,385,012 A * | 5/1983 | Priestley ............... 261/112.2 |
| 4,512,938 A | 4/1985 | Jones et al. ............. 261/112 |
| 4,634,534 A * | 1/1987 | Cominetta et al. ....... 210/150 |
| 4,675,103 A * | 6/1987 | Nadudvari et al. ...... 210/150 |
| 5,124,087 A * | 6/1992 | Bradley et al. .......... 261/112.2 |
| 5,147,583 A * | 9/1992 | Bugler, III et al. ..... 261/112.2 |
| 5,624,733 A * | 4/1997 | McKeigue et al. ...... 428/182 |

* cited by examiner

*Primary Examiner*—Scott Bushey
(74) *Attorney, Agent, or Firm*—Baker & Hostetler LLP

(57) ABSTRACT

A heat exchange apparatus for a cooling tower having first and second corrugated film, fill sheets. Each film fill sheet includes a plurality of arch shaped dimple features oriented to forms various rows of the arch shaped dimple features. The first and second sheet are connected wherein the spacing between the sheets is equal to approximately 1.0 inches.

20 Claims, 5 Drawing Sheets

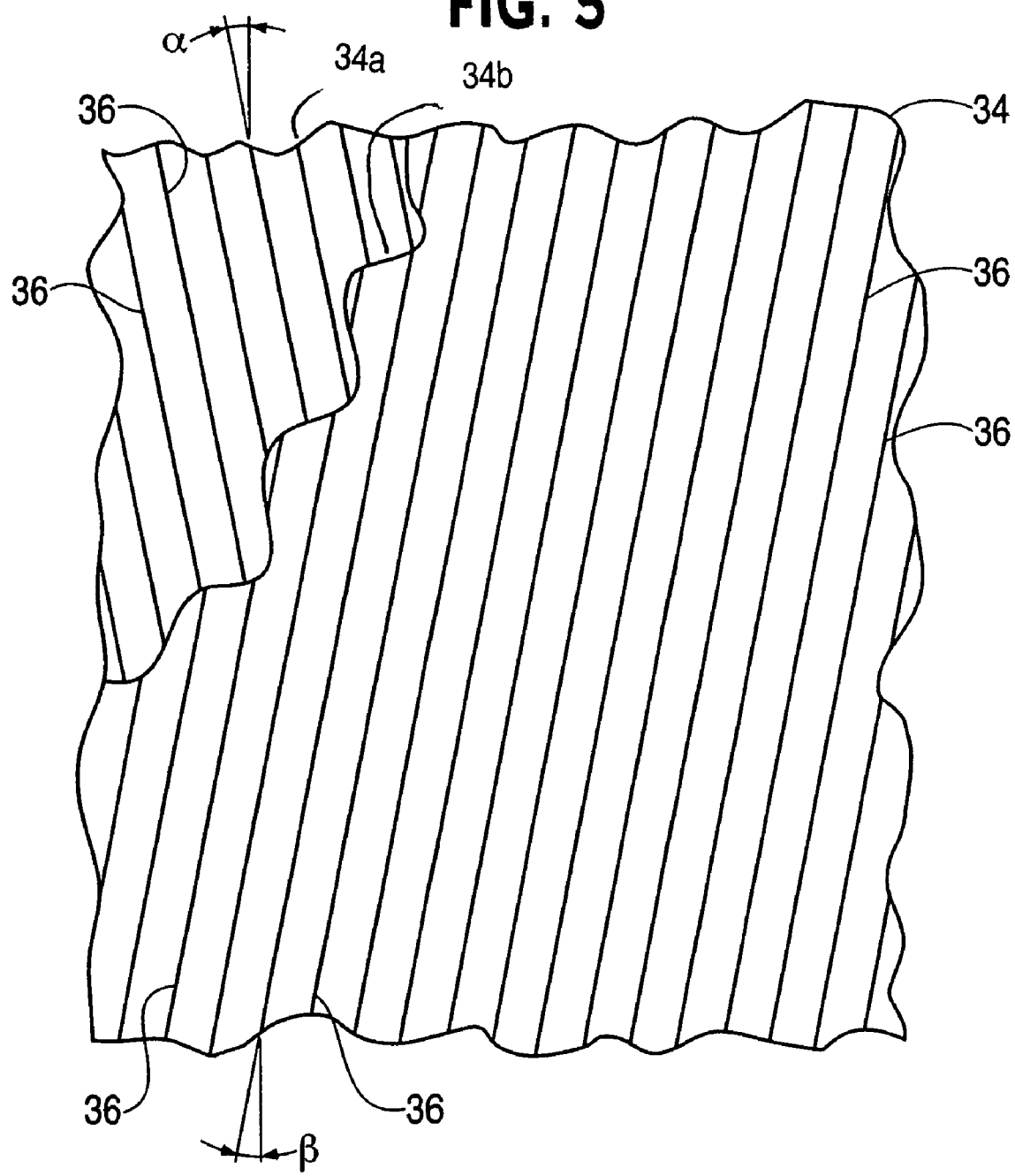

COOLING TOWER FILM FILL APPARATUS AND METHOD

FIELD OF THE INVENTION

This invention relates to industrial water cooling towers and especially to an improved non-clogging film fill assembly for use in counterflow type cooling towers.

BACKGROUND OF THE INVENTION

Industrial water cooling towers have long been used to reject heat in power generation, to provide cooling water for petrochemical processes, and serve as a means to lower the temperature of various chemical process streams and equipment. In the case of power generation plants, the cooling tower requirements are relatively large and it has been the practice in recent years to fabricate increasingly larger cooling towers. Counterflow towers have been found to be especially useful in these instances because of the efficiency of the towers and the compact nature of the tower structure. During the operation of counterflow cooling towers, cooling air is brought into heat exchange relationship with the hot water either by way of convection through use of a natural draft stack, or by means of one or more large diameter, power-driven fans.

In order to further increase the efficiency of cooling towers for industrial applications which require the use of very large towers, efforts have been made to increase the effectiveness of heat exchange between the hot water and the cooling air. The degree of direct contact of the water to be cooled with the air has a significant bearing on the efficiency of the cooling process. Counterflow towers, wherein the hot water and air are brought into countercurrent flow relationship have long been known to be efficient heat transfer units. Initial egg crate or slat splash bar towers were ultimately supplanted by film fill towers because of the greater heat transfer properties of a water film as compared with the multiplicity of droplets of water which are produced by splash fills. Furthermore, film fills are significantly shorter than splash fills thus decreasing the head on the pump delivering hot water to the tower and thereto making tower operation less expensive because of the lower horsepower pump requirements.

The superior heat transfer characteristics of counterflow towers as well as improved efficiency based on lower pump heads has accelerated their use in recent years. Cooling tower designers, in seeking to increase the efficiency of counterflow towers, have also sought to further decrease the overall height of such towers by making the fill more effective than has been the case in the past. With the advent of synthetic resin sheets which are capable of withstanding higher temperatures without significant deformation than was previously the case, along with the development of resin formulations which are more resistant to deterioration under constant wet conditions, film fill assemblies for have in many instances completely supplanted prior fill structures. These prior fill structures primarily relied upon break-up of the water for surface increase purposes instead of thin films of water over a large multiplicity of closely spaced sheets of plastic.

Although film fills have found acceptance in many applications including large industrial cooling towers for power generating plants and the like, problems have arisen by virtue of the fact that governmental regulatory agencies have imposed stricter limitations on the addition of agents which suppress growth of microorganisms and the like to the cooling water. For example, it has long been the practice to add chlorine or chlorine containing compounds to the cooling water in order to prevent microorganism growth. However, it is now known that when chlorine in high concentrations is discharged into streams or other natural bodies of water, the chlorine can produce adverse consequences which are harmful to biological life in the stream and in general increase what some deem to be undesirable pollution of the flowing water.

In response to the aforementioned problems, cooling tower operators have routinely removed a portion of the cooling tower water in the form of blow down and returned it to the source such as a stream to prevent buildup of chemical additives in the water. As much as 10% of the water may be continuously returned to the stream or other water source as blow down. This water can contain a relatively high concentration of additives and therefore significant amounts of chlorine, for example, may be present at the outlet of the cooling tower which discharges into the adjacent stream, lagoon, or lake water source. Concern over stream and water body pollution has led governmental authorities to restrict the use of additives such as chlorine in cooling tower water for preventing growth of microorganisms in the recirculating cooling water. In fact, absent a more acceptable anti-microbial additive than chlorine and which is available at a reasonable cost, many tower operators have elected to simply eliminate or drastically reduce the additives such as chlorine in the cooling tower water.

As a result of the reduction or elimination of additives, the build up of microorganism growth in the flow assembly of counterflow industrial water cooling towers has occurred. This is due to the fact that counterflow towers oftentimes employ corrugated plastic sheets which are positioned so that adjacent corrugations cross one another at approximately a 30° angle. The peaks of the corrugations therefore contact one another where the peaks cross. In a cross-corrugated fill utilizing plastic corrugated sheets which are spaced a distance such that the greatest spacing there between is of the order of ⅔ inch, there can for example, be as many as 646 contact points or nodes per cubic foot of the fill assembly. These nodes serve as habitats for microorganisms which proliferate around the contact point. As the water to be cooled flows downwardly through the corrugated fill structure, microorganisms present in the water and whose growth is no longer inhibited by suitable anti-microbial compounds in the water, collect at the points of intersection of the corrugations of the fill. The microorganisms then start to multiply at the nodal points in the fill assembly. This growth oftentimes continues until complete blockage of the water flow paths through the fill unit occurs.

In like manner, unless the cooling tower water is continuously filtered, suspended solids in the make-up water from the stream or other natural water source can collect and accumulate in the water. These solids are trapped by the microorganism growths in the fill assembly and exacerbate the blockage of the water flow paths. In addition, airborne solids can build up in the water during tower operation unless the water is filtered.

The significance of the problem is apparent when it is recognized that in the cooling towers are oftentimes employed in large power plants where, if the plant must be shut down because of blockage of the fill assembly of the cooling tower serving such plant, the loss of revenue to the utility can be very costly per day. The replacement of the fill can take from up to one to two months and thus, lost revenues can readily mount.

The problem is further exacerbated by the fact that cooling towers of the type discussed and especially those used for larger energy generation plants such as nuclear facilities, have fill assemblies whose plan area can be anywhere from one to two acres, for example.

Another factor involves the insidious nature of the problem. Microorganisms and solid object blockage of the cooling tower fill necessarily occurs in a gradual form. Thus, the performance of the tower will gradually decrease over time which has an adverse economic impact on cooling of the steam used in the plant and decreasing the efficiency of the generation process. This produces a slow loss in output which translates directly into decreased income to the utility. The tendency is to defer replacement of the fill for as long as possible because of the cost of tearing out the old fill and replacing it with a new assembly.

Accordingly, there is a need in the art to provide an apparatus and method that provides an efficient, non-clogging heat transfer fill assembly for use with a cooling tower. More particularly, there is a need in the art for a film fill sheet that provides for the efficient transfer of heat and the suppression of the growth of microorganisms.

SUMMARY OF THE INVENTION

The foregoing needs are met, to a great extent, by the present invention, wherein the aspects of a cooling tower film fill apparatus are provided.

In accordance with another embodiment of the present invention, a heat exchange apparatus for a cooling tower is provided, comprising a first corrugated, film sheet that generally lies within a plane. The first corrugated film sheet includes a plurality of first arch shaped dimple features oriented adjacent to one another to form a first row along with a plurality of second arch shaped dimple features oriented adjacent to one another to form a second row. The apparatus also comprises a second corrugated, film sheet that generally lies parallel to the plane. The second corrugated film sheet includes a plurality of third arch shaped dimple features oriented adjacent to one another to form a third row along with a plurality of fourth arch shaped dimple features oriented adjacent to one another to form a fourth row. The first film fill sheet and second film fill sheet preferably have a spacing between one another equal to approximately 1.2 inches.

In accordance with yet another embodiment of the present invention, a heat exchange apparatus for a cooling tower is provided, comprising a first corrugated, film sheet that generally lies within a plane. The first corrugated film sheet includes a plurality of first arch shaped dimple features oriented adjacent to one another to form a first row along with a plurality of second arch shaped dimple features oriented adjacent to one another to form a second row. The apparatus also comprises a second corrugated, film sheet that generally lies parallel to the plane. The second corrugated film sheet includes a plurality of third arch shaped dimple features oriented adjacent to one another to form a third row along with a plurality of fourth arch shaped dimple features oriented adjacent to one another to form a fourth row. The first film fill sheet and second film fill sheet preferably have a spacing between one another equal to approximately 1 inches.

In accordance with still another embodiment of the present invention, a heat exchange apparatus for a cooling tower is provided, comprising a first corrugated, film sheet that generally lies within a plane. The first corrugated film sheet includes a plurality of first arch shaped dimple features oriented adjacent to one another to form a first row along with a plurality of second arch shaped dimple features oriented adjacent to one another to form a second row. The apparatus also comprises a second corrugated, film sheet that generally lies parallel to the plane. The second corrugated film sheet includes a plurality of third arch shaped dimple features oriented adjacent to one another to form a third row along with a plurality of fourth arch shaped dimple features oriented adjacent to one another to form a fourth row. The first film fill sheet and second film fill sheet preferably have a spacing between one another equal to approximately 0.86 inches.

In accordance with still another embodiment of the present invention, a cooling tower for heat exchange is provided, wherein the cooling tower includes a heat exchange fluid which falls in a generally downward direction along a vertical plane. The cooling tower comprises a fill assembly which includes a first corrugated, film sheet that generally lies within the plane. The first corrugated film sheet includes a plurality of first arch shaped dimple features oriented adjacent to one another to form a first row along with a plurality of second arch shaped dimple features oriented adjacent to one another to form a second row. The fill assembly also comprises a second corrugated, film sheet that generally lies parallel to the plane. The second corrugated film sheet includes a plurality of third arch shaped dimple features oriented adjacent to one another to form a third row along with a plurality of fourth arch shaped dimple features oriented adjacent to one another to form a fourth row. The first film fill sheet and second film fill sheet preferably have a spacing between one another equal to approximately 1.2 inches. The cooling tower also includes a support structure that supports the sheets.

In accordance with still another embodiment of the present invention, a method for exchanging heat between a heated liquid and a cooling gas in a cooling tower is provided, comprising the steps of: passing the heated liquid over a fill assembly, wherein the fill assembly comprises: a first corrugated, film sheet that lies generally within a plane, wherein said sheet comprises a plurality of first arch shaped dimple features oriented adjacent to one another to form a first row and a plurality of second arch shaped dimple features oriented adjacent to one another to form a second row; and a second corrugated, film sheet connected to said first film sheet that lies generally within the plane, wherein said second corrugated, film sheet that comprises a plurality of third arch shaped dimple features oriented adjacent to one another to form a third row and a plurality of fourth arch shaped dimple features oriented adjacent to one another to form a fourth row, wherein said first film sheet and said second film sheet have a spacing between one another equal to approximately 1.2 inches; directing the cooling air over the first and second film fill sheets; and contacting the heated liquid with the cooling air as the heated liquid passes over the fill assembly.

In accordance with still another embodiment of the present invention, a heat exchange apparatus for a cooling tower is provided comprising: means for passing the heated liquid over a means for heat exchange, wherein said means for heat exchange comprises: a first corrugated, film sheet that lies generally within a plane, wherein said sheet comprises a plurality of first arch shaped dimple features oriented adjacent to one another to form a first row and a plurality of second arch shaped dimple features oriented adjacent to one another to form a second row; and a second corrugated, film sheet connected to said first film sheet that lies generally within the plane, wherein said second corrugated, film sheet that comprises a plurality of third arch shaped dimple features oriented adjacent to one another to form a third row and a plurality of fourth arch shaped dimple features oriented adjacent to one another to form a fourth row, wherein said first film sheet and said second film sheet have a spacing between one another equal to approximately 1.2 inches; means for directing the cooling air over the first and second film fill sheets; and means for contacting the heated liquid with the cooling air as the heated liquid passes over the means for heat exchange.

In accordance with another embodiment of the present invention, a heat exchange apparatus for a cooling tower is provided, comprising a first corrugated, film sheet that generally lies within a plane. The first corrugated film sheet includes a plurality of first arch shaped dimple features oriented adjacent to one another to form a first row along with a plurality of second arch shaped dimple features oriented adjacent to one another to form a second row. The apparatus also comprises a second corrugated, film sheet that generally lies parallel to the plane. The second corrugated film sheet includes a plurality of third arch shaped dimple features oriented adjacent to one another to form a third row along with a plurality of fourth arch shaped dimple features oriented adjacent to one another to form a fourth row. In this embodiment, the first, second third and fourth arch shaped dimple features each include a series of grooves disposed thereon.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology. employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a partial schematic view two film fill sheets illustrating the angles of the corrugations of the adjacent film fill sheets in accordance with an embodiment of the present invention.

DETAILED DESCRIPTION

Figure 1:
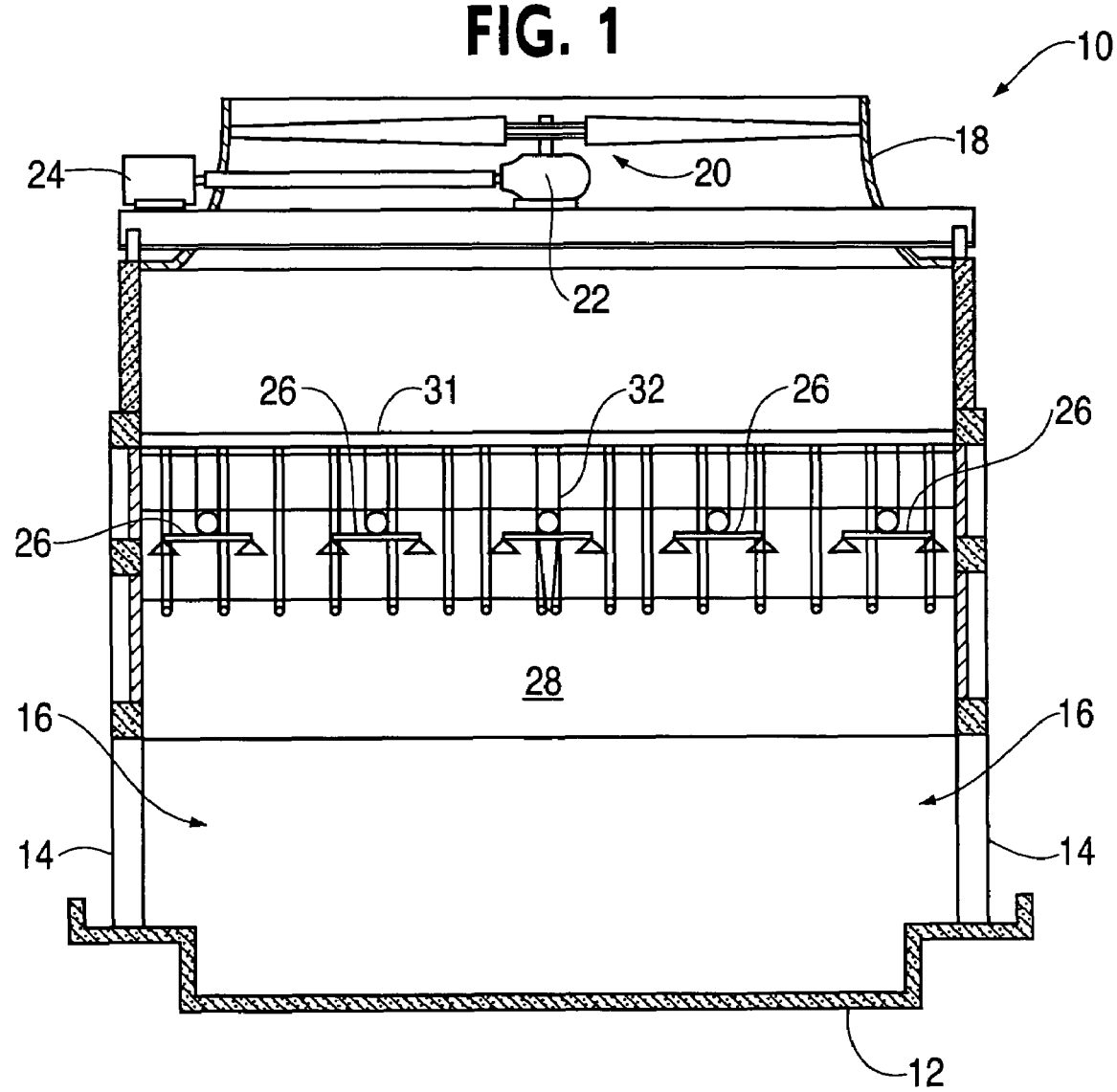
FIG. 1 is a schematic side view of a cooling tower employing a film fill assembly in accordance with an embodiment of the present invention.

Various preferred embodiments of the present invention provide for a film fill apparatus and method for heat exchange between a liquid and air, for use in cooling tower and preferably, a counterflow cooling or the like. In some arrangements, the apparatus and method are utilized in film fill packs of a fill assembly, however, the film fill apparatus may be utilized singularly if desired. It should be understood, however, that the present invention is not limited in its application to cooling towers or counterflow cooling towers, but, for example, can be used with other systems and/or other apparatuses that require heat exchange between liquid and air. Preferred embodiments of the invention will now be further described with reference to the drawing figures, in which like reference numerals refer to like parts throughout.

Referring now to FIG. 1, a standard mechanical draft cooling tower, generally designated 10, is schematically depicted. The cooling tower 10 includes a water basin 12 connected to a frame assembly or structure, generally designated 14. The frame assembly 14 includes air inlets 16 which are located on the sides of the frame assembly 14 above the water basin 12. The cooling tower 10 also includes an air generator stack or fan stack 18 connected to the frame assembly 14 having a blade assembly 20 disposed therein. The blade assembly 20 is rotated by a gear structure 22 which is in turn driven by a motor 24.

As illustrated in FIG. 1, the cooling tower 10 also includes a plurality of hot liquid distributors 26, preferably spray nozzles, located beneath the blade assembly 20. The fill structure, generally designated 28, directly underlies the hot liquid distributors 26 and extends across the entire horizontal area of the frame assembly 14 between walls of the frame assembly 14, directly above the air inlets 16.

As illustrated in FIGS. 1–4, the fill structure 28 is made up of a number of film fill packs 30, wherein each fill pack comprises a plurality of individual film fill sheets 34 connected to one another. The film fill packs 30 can be of various sizes and dimensions depending upon size and dimensions of the cooling tower in which they are employed, however they are essentially of the same dimensions between the air inlets 16 whereas the innermost packs 30 may be of lesser width. The number of packs 30, like their dimensions, is dependent upon the particular installation and the size of the tower in which the packs 30 are employed.

The film fill packs 30 are supported in the cooling tower 10 by a plurality of horizontally disposed and spaced crossmembers 31 located above the liquid distributors 26 which are connected to tube members 32. The tube members 32 extend through the upper portions of the film fill packs 30. Although two tube members 32 per each pack 30 are shown, additional tube members 32 may be provided for each pack depending upon the overall dimensions of the film fill pack 30.

Figure 2:
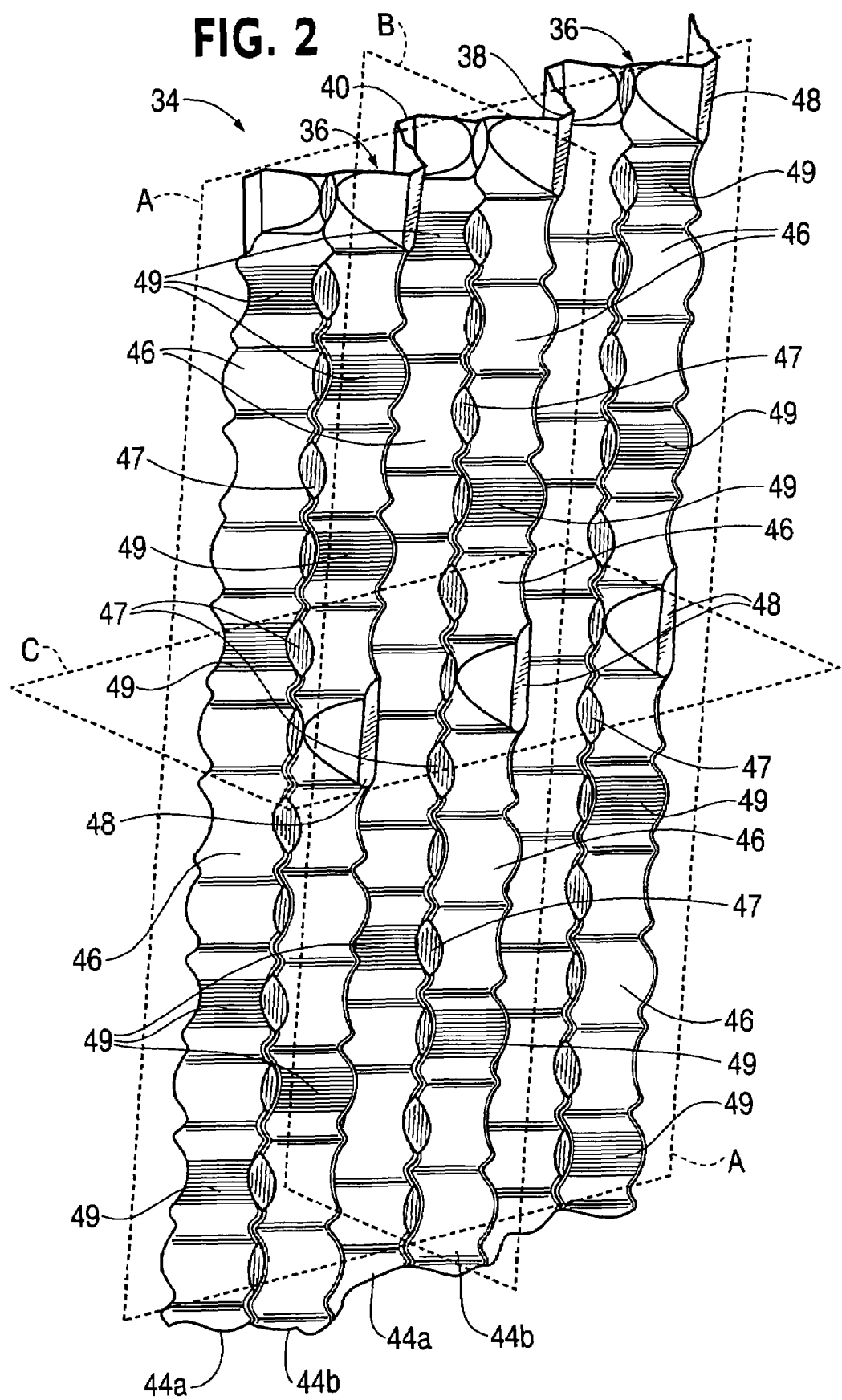
FIG. 2 is side perspective view of a film fill sheet in accordance with an embodiment of the present invention.
Figure 3:
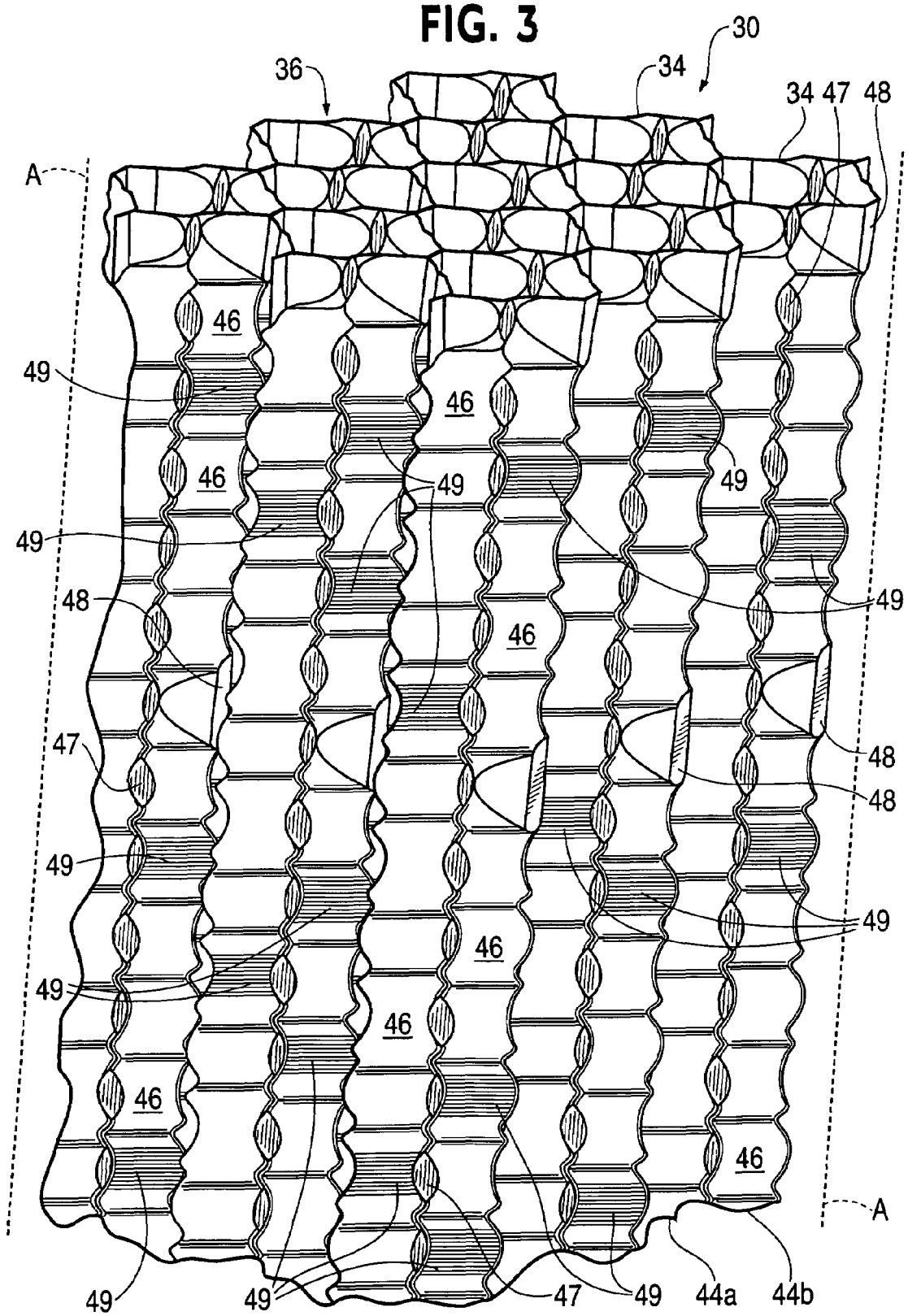
FIG. 3 is a perspective view of a fill pack employing multiple film fill sheets similar to that illustrated in FIG. 2.
Figure 4:
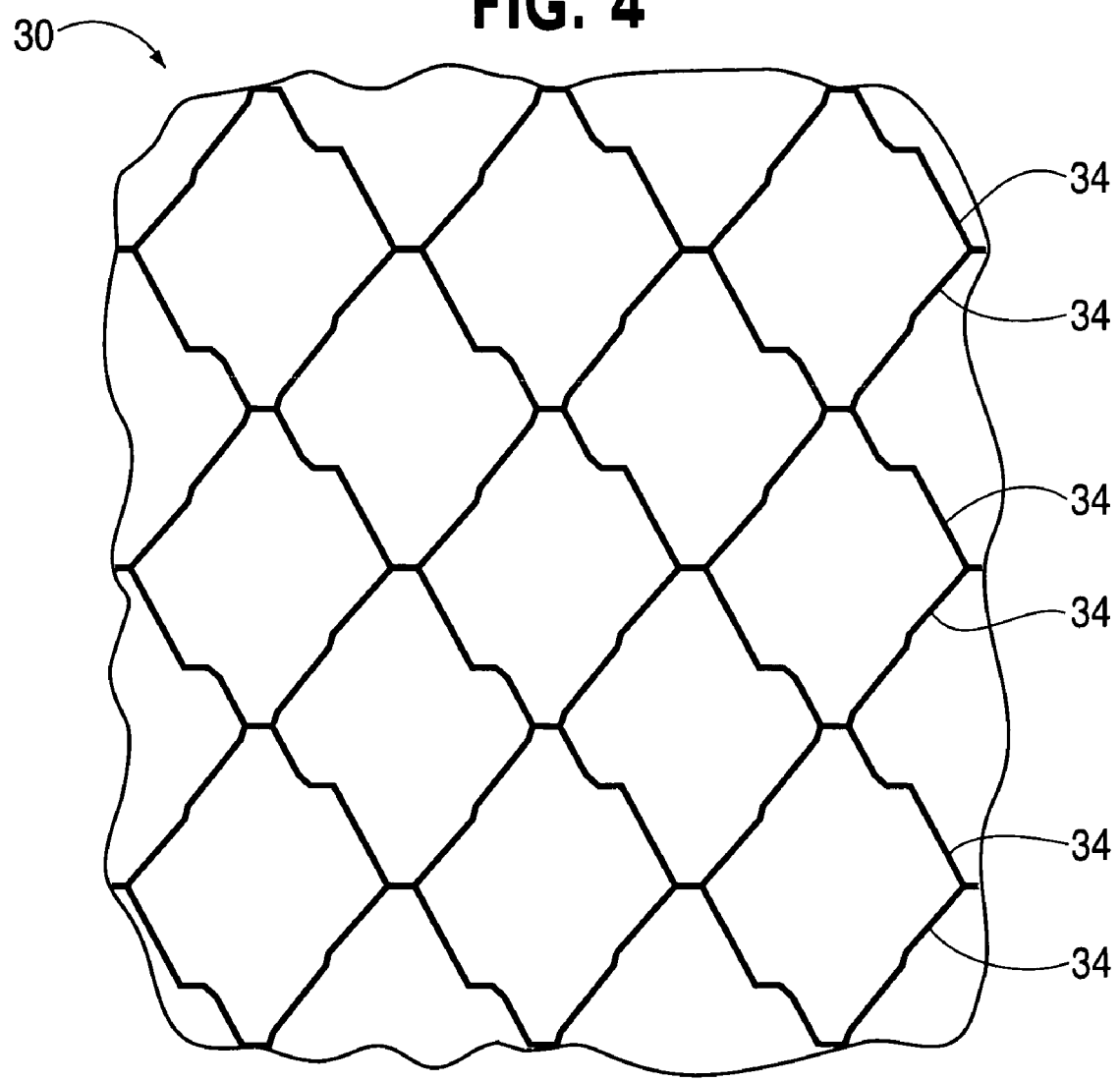
FIG. 4 is an end view of a fill pack employing multiple film fill sheets similar to that illustrated in FIGS. 2 and 3.

Referring now specifically to FIGS. 2–4, as previously mentioned, each of the film fill packs 30 is made up of a series of upright, individual film fill sheets 34, which are joined together in a parallel, side-by-side relationship. As illustrated in FIG. 2, the film fill sheets 34 are preferably synthetic resin sheets vacuum formed to provide undulations and depressions and projections in the surface thereof, as will be hereinafter be described in detail below. Alternatively, the sheets 34 may be formed by various other methods of manufacture known in the art.

For descriptive purposes, only one of the film fill sheets 34 will be herein described. The film fill sheet 34 is preferably constructed from a synthetic resin via a vacuum form process. The sheet 34 can vary in thickness depending upon the application, however the sheet 34 must be of sufficient thickness so that it can withstand elevated temperatures typically encountered during operation of a cooling tower. The sheet 34 preferably ranges in thickness from approximately 15 mills to approximately 25 mills. More preferably, the film fill sheet has a thickness of approximately 15 mills.

As illustrated in FIGS. 1–5, the film fill sheet 34 is generally planar wherein the sheet 34 generally lies in a plane A, which is perpendicular or normal to plane B. Referring specifically to FIG. 5, two adjacent film fill sheets 34 of a film fill pack are illustrated, 34a and 34b, respectively, and each film fill sheet 34 has a series of corrugations, generally designated 36, which are positioned at an angle α, β with respect the plane B. For example, the corrugations on sheet 34a are positioned at an angle α to plane B while the corrugations 36 on sheet 34b are positioned at an angle α equal to angle α. These angles may vary however the corrugations 36 are preferably positioned at an angle α, β to plane B that ranges from approximately 80° to approximately 15°. More preferably, the corrugations 36 are positioned at an angle α, β to plane B that ranges from approximately 10° to approximately 12°. In one preferred embodiment of the present invention, the corrugations 36 are positioned approximately at an 11° angle α, β to the plane B. The corrugations 36 include peaks and valleys, 38 and 40 respectively that extend the entire sheet 34 generally along plane A. The corrugations preferably include two adjacent rows 44(a) and 44(b) of alternating dimple features 46, of which the rows 44(a), 44(b) are parallel to one another. The dimple features 46 are generally arch shaped, wherein dimple features positioned adjacent one another in adjacent rows 44(a), 44(b), extend into the plane A in row 44(a) while the dimple features extend out of the plane A in the adjacent row 44(b). This orientation may be alternatively described as the adjacent dimple features 46 alternate or transition between a convex geometry and a concave geometry, and vice versa, along plane A. This alternating convex and concave geometry of the dimple features 46 is also true along plane B. This orientation is also present for adjacent dimple features 46 located within the same row 44 (a), 44(b). Furthermore, the dimple features 46 are preferably positioned such that each of the axes lies in plane C. As depicted in FIG. 2, a transition area 47 that is generally elliptical shape extends between the dimple features 46 located adjacent one another in adjacent rows 44(a), 44(b).

Alternative embodiments encompassed by the present invention may include sheets 34 having corrugations grouping with more that two rows. Moreover, alternative embodiments may include corrugation patterns wherein the dimple features 46 extend into, and out, of the plane A in varying patterns and arrangements, such as non-alternating arrangements. Also, alternative embodiments of the present invention may include dimple features 46 that are geometries that vary from the illustrated arch-shaped geometry, for example straight-lined geometries, V-shaped geometries and/or multi-facetted geometries.

As illustrated in FIGS. 1–5, each of the dimple features preferably is grooved or includes a series of grooves 49 that extend along the surface of each of the dimple features. The amount of the grooves 49 and the spacing between each individual groove may vary depending upon film fill sheet 34 application, however the grooves 49 are preferably positioned such that their center line to center line spacing is equal to approximately 0.009".

Referring now to FIGS. 2–4, the film fill packs 30 are made up of a plurality of individual film fill sheets 34 connected to one another. The sheets 34 are preferably connected to one another via an adhesive at the connection points 48, wherein the connection points 48 are of generally flat, oval geometry to provide precise spacing between adjacent sheets 34. The film fill sheets 34 may alternatively be connected to one another via alternative attachment or connection means for example, mechanical attachment or the application of heat.

As illustrated in FIGS. 3–5, the individual sheets 34 are preferably connected to one another so that the individual film fill packs 30 are sight tight, however sightness is not required. By sight tight it is meant that if one were to attempt look vertically through the packs 30, he or she could not look directly through and view the other side. Due to the aforementioned sight tightness, water droplets falling from the spray nozzles 26 do not fall unimpeded through packs 30 and instead, contact the individual sheets 34 that make up the film fill packs 30.

As previously described, a plurality of individual film fill sheets 34 combine to form a film fill pack 30. Depending upon the cooling tower dimensions in which the film fill packs 30 and sheets 34 are employed, the size of the individual packs 30 and the amount of sheets 34 used for each pack 30 may vary. Moreover, depending upon the dimension of the cooling tower, the spacing between adjacent film fill sheets 34 within an individual film fill pack 30 may also vary. However, in one preferred embodiment of the present invention, a film fill pack 30 preferably comprises 10 film fill sheets per foot. In this preferred embodiment, spacing between adjacent sheets 34 is approximately 1.2 inches. In another preferred embodiment of the present invention, a film fill pack 30 preferably comprises 12 film fill sheets per foot. In this preferred embodiment, spacing between adjacent sheets 34 is approximately 1.0 inches. In yet another preferred embodiment of the present invention, a film fill pack 30 preferably comprises 14 film fill sheets per foot. In this preferred embodiment, spacing between adjacent sheets 34 is approximately 0.86 inches.

Also, as illustrated in FIGS. 3–5, adjacent film sheets 34 within a pack 30 are positioned so that one sheet in positioned within plane A or plane B, while the adjacent sheet is positioned so that it is rotated about plane A or plane B to compliment the sheet 34 that lies within plane A or plane B. The aforementioned positioning of adjacent sheets 34, provides a desired cross-corrugated geometry as illustrated in FIGS. 4 and 5.

Referring to FIGS. 1–4, during operation of the cooling tower 10, hot water that has not been significantly treated to retard algae growth or proliferation of microorganisms is delivered to the spray nozzles 26. The water is then delivered onto the tops of the individual fill packs 30 of the fill structure 28, while air is simultaneously pulled through the cooling tower 10 by the blade assembly 20 through the inlets 16. Upon impact with the film fill packs 30 and the sheets 34, the water tends to form a film on the surfaces, and corrugations located thereon, of the film fill sheets 34 and gravitate downwardly along the length of the sheets 34. As the water films and gravitates downward heat exchange occurs and then any residual liquid proceeds to gravitate into the collection basin 12.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A heat exchange apparatus for a cooling tower, comprising:
    a first corrugated, film sheet that lies generally within a first plane that is generally normal to a second plane, wherein said sheet comprises a first series of corrugations, said first series comprising a plurality of first arch shaped dimple features oriented adjacent to one another to form a first row and a plurality of second arch shaped dimple features oriented adjacent to one another to form a second row, wherein said first series of corrugations is positioned at angle to said second plane equal to approximately 8° to approximately 15°; and
    a second corrugated, film sheet connected to said first film sheet that is rotated about the first plane, wherein said second corrugated, film sheet comprises a second series of corrugations, said second series comprising a plurality of third arch shaped dimple features oriented adjacent to one another to form a third row and a plurality of fourth arch shaped dimple features oriented adjacent to one another to form a fourth row, wherein said second series of corrugations is positioned at an angle to said second plane equal to approximately 8° to approximately 15°,
    wherein said first film sheet and said second film sheet have a spacing between one another equal to approximately 1.2 inches and wherein each of said first film sheet and said second film sheet comprise a series of connection points wherein said connection points have a generally flat, oval geometry.

2. The heat exchange apparatus according to claim 1, wherein said dimple features located in said first and second rows adjacent to one another are oriented in alternating relationship wherein said first dimple features extend in a first direction with respect to the first plane and wherein said second dimple extends in a second, opposite direction with respect to the first plane, and
    wherein said dimple features located in said third and fourth rows adjacent to one another are oriented in alternating relationship wherein said third dimple features extend said first direction with respect to the first plane and wherein said fourth dimple extends in said second, opposite direction with respect to the first plane.

3. The heat exchange apparatus according to claim 2, wherein adjacent ones of said first arch shaped dimple features are oriented in said alternating relationship within said first row.

4. The heat exchange apparatus according to claim 3, wherein adjacent ones of said second arch shaped dimple features are oriented in said alternating relationship within said second row.

5. The heat exchange apparatus according to claim 4, wherein adjacent ones of said third arch shaped dimple features are oriented in said alternating relationship within said third row.

6. The heat exchange apparatus according to claim 5, wherein adjacent ones of said fourth arch shaped dimple features are oriented in said alternating relationship within said fourth row.

7. The heat exchange apparatus according to claim 6, wherein said first direction is into the first plane and said second direction out of said first plane.

8. The heat exchange apparatus according to claim 1, wherein said first, second, third and fourth arch-shaped dimple features include a series of grooves disposed thereon.

9. The heat exchange apparatus according to claim 8, wherein said grooves have a center lines spacing between adjacent grooves equal to approximately 0.009".

10. The heat exchange apparatus according to claim 1, wherein said first series of corrugations is positioned at an angle to said second plane equal to 11° and said second series of corrugations is positioned at an angle to said second plane equal to 11°.

11. A heat exchange apparatus for a cooling tower, comprising:
    a first corrugated, film sheet that lies generally within a first plane that is generally normal to a second plane, wherein said sheet comprises a plurality of first arch shaped dimple features oriented adjacent to one another to form a first row and a plurality of second arch shaped dimple features oriented adjacent to one another to form a second row, wherein said first row and said second row are each positioned at an angle to the second plane equal to approximately 8° to approximately 15°; and
    a second corrugated, film sheet connected to said first film sheet that is rotated about the first plane, wherein said second corrugated, film sheet comprises a plurality of third arch shaped dimple features oriented adjacent to one another to form a third row and a plurality of fourth arch shaped dimple features oriented adjacent to one another to form a fourth row, wherein said third row and said fourth row are each positioned at an angle to the second plane equal to approximately 8° to approximately 15°,
    wherein said first film sheet and said second film sheet have a spacing between one another equal to approximately 0.86 inches and wherein each of said first film sheet and said second film sheet comprise a series of connection points wherein said connection points have a generally flat, oval geometry, and
    wherein said dimple features located in said first and second rows adjacent to one another are oriented in alternating relationship wherein said first dimple features extend in a first direction with respect to the first plane and wherein said second dimple extends in a second, opposite direction with respect to the first plane, and
    wherein said dimple features located in said third and fourth rows adjacent to one another are oriented in alternating relationship wherein said third dimple features extend said first direction with respect to the first plane and wherein said fourth dimple extends in said second, opposite direction with respect to the first plane, wherein adjacent ones of said first arch shaped dimple features are oriented in said alternating relationship within said first row.

12. The heat exchange apparatus according to claim 11, wherein adjacent ones of said second arch shaped dimple features are oriented in said alternating relationship within said second row.

13. The heat exchange apparatus according to claim 12, wherein adjacent ones of said third arch shaped dimple features are oriented in said alternating relationship within said third row.

14. The heat exchange apparatus according to claim 13, wherein adjacent ones of said fourth arch shaped dimple features are oriented in said alternating relationship within said fourth row.

15. The heat exchange apparatus according to claim 14, wherein said first direction is into the first plane and said second direction out of said first plane.

16. The heat exchange apparatus according to claim 11, wherein said first and second rows are positioned at an angle to said second plane equal to 11° and said third and fourth rows are positioned at an angle to said second plane equal to 11°.

17. A cooling tower for heat exchange having a heat exchange fluid which falls in a generally downward direction along a vertical plane, comprising:

a fill assembly, said fill assembly comprising:

a first corrugated, film sheet that lies generally within a first plane that is generally normal to a second plane, wherein said sheet comprises a plurality of first arch shaped dimple features oriented adjacent to one another to form a first row and a plurality of second arch shaped dimple features oriented adjacent to one another to form a second row, wherein said first row and said second row are each positioned at an angle to the second plane equal to approximately 8° to approximately 15°; and a second corrugated, film sheet connected to said first film sheet that is rotated about the first plane, wherein said second corrugated, film sheet comprises a plurality of third arch shaped dimple features oriented adjacent to one another to form a third row and a plurality of fourth arch shaped dimple features oriented adjacent to one another to form a fourth row, wherein said third row and said fourth row are each positioned at an angle to the second plane equal to approximately 8° to approximately 15°, wherein said first film sheet and said second film sheet have a spacing between one another equal to approximately 1 inch and wherein each of said first film sheet and said second film sheet comprise a series of connection points wherein said connection points have a generally flat, oval geometry; and a support structure that supports said first corrugated film sheet and said second corrugated film sheet.

18. The heat exchange apparatus according to claim 17, wherein said first, second, third and fourth arch-shaped dimple features include a series of grooves disposed thereon.

19. The heat exchange apparatus according to claim 18, wherein said grooves have a center lines spacing between adjacent grooves equal to approximately 0.009".

20. The heat exchange apparatus according to claim 17, wherein said first and second rows are positioned at an angle to said second plane equal to 11° and said third and fourth rows are positioned at an angle to said second plane equal to 11°.

* * * * *